United States Patent [19]

Carroll

[11] Patent Number: 4,794,508
[45] Date of Patent: Dec. 27, 1988

[54] PWM CONTROL CIRCUIT FOR A NON-SYMMETRICAL SWITCHING POWER SUPPLY

[75] Inventor: David T. Carroll, Sonoma, Calif.
[73] Assignee: DCI Technology, Sonoma, Calif.
[21] Appl. No.: 137,786
[22] Filed: Dec. 23, 1987
[51] Int. Cl.[4] .............................................. H02M 3/24
[52] U.S. Cl. ........................................ 363/95; 363/21; 363/41; 363/97
[58] Field of Search ........................ 363/21, 26, 41, 95, 363/97, 134

[56] References Cited

U.S. PATENT DOCUMENTS

| | | | |
|---|---|---|---|
| 4,347,559 | 8/1982 | Sturgeon | 363/21 |
| 4,404,623 | 9/1983 | Jourdan | 363/97 |
| 4,425,613 | 1/1984 | Shelly | 363/26 |
| 4,616,301 | 10/1986 | Small | 363/97 |

OTHER PUBLICATIONS

Motorola Power MOSFET Transistor Data, p. A-72.
Motorola Data Book, p. A-74.
Abraham Pressman, "Switching and Linear Power Supply, Power Converter Design", Hayden Book Company, N.J., 1977.

Primary Examiner—Patrick R. Salce
Assistant Examiner—Jeffrey Sterrett
Attorney, Agent, or Firm—Brian D. Ogonowsky; Alan H. MacPherson; Paul J. Winters

[57] ABSTRACT

A control circuit is disclosed which provides a pulse-width modulated, quasi-squarewave control signal to a switching transistor in a non-symmetrical switching power supply. A primary winding of a sense transformer is coupled in series with a switching transistor and a first winding of a magnetic device, such as a power transformer. A load resistor is placed across a secondary winding of the sense transformer so that the voltage across the secondary winding of the sense transformer ramps up with the current through the first winding of the magnetic device. This increasing voltage is compared by a voltage comparator to a feedback signal corresponding to the output voltage of the power supply so that when the voltage across the secondary winding of the sense transformer exceeds that of the feedback signal, the output of the voltage comparator will be low, turning the switching transistor off. The magnetic device now dumps its stored energy into the output load. After the magnetic device has dumped its energy, the switching transistor is once again enabled. Thus, the duty cycle of the switching transistor is being constantly adjusted to keep the power supply output voltage at a predetermined level.

6 Claims, 2 Drawing Sheets

PWM CONTROL CIRCUIT FOR A NON-SYMMETRICAL SWITCHING POWER SUPPLY

BACKGROUND

1. Field of the Invention

This invention relates to control circuits which provide voltage regulation for switching power supplies, and in particular to an improved, less costly control circuit.

2. Description of Prior Art

My invention may be incorporated in a variety of types of non-symmetrical power supplies where current is loaded into a magnetic device, such as a transformer or an inductor, in one direction only. A representative prior art non-symmetrical switching power supply is shown in FIG. 1a. FIG. 1a is a flyback switching power supply by Motorola, which can be found in the book *Motorola Power MOSFET Transistor Data*, p. A-72. The operation of a flyback switching power supply similar to that shown in FIG. 1a is described in detail in a copending application entitled, "An Improved Voltage Regulator Circuit", by David T. Carroll, Ser. No. 07/137,787, filed Dec. 23, 1987, submitted herewith and herein incorporated by reference. The operation of the flyback switching power supply of FIG. 1a is as follows. DC voltage $V_{in}$ is applied to the non-dot-end (dots indicate the relative polarity of a voltage across a winding) of primary winding W1 of transformer T1. Switching transistor Q1, coupled between the dot-end of winding W1 and ground GND1, is controlled by pulsewidth modulator 10 so that when transistor Q1 is on, current flows through winding W1, and, when transistor Q1 is off, current ceases to flow through winding W1. As seen by the locations of the dot-ends of windings W2, W3, and W4 of transformer T1, the polarities of the voltages across windings W2, W3 and W4 are opposite that of the polarity of voltage $V_{in}$ across winding W1. Thus, when transistor Q1 is on and $V_{in}$ is applied across winding W1, the voltage at the dot-end of windings W2, W3, and W4 will be negative with respect to their respective grounds. Thus, when $V_{in}$ is applied across winding W1, diode D1, whose anode is connected to the dot-end of secondary winding W2 of transformer T1, is reverse biased along with diodes D2 and D3 whose anodes are similarly connected to the dot-ends of secondary winding W3 and auxiliary winding W4. Transformer T1 now linearly charges up due to the current through winding W1 and stores energy in the form of a magnetic field in the core of transformer T1. During this time, the proper output voltage $V_{out}$ and necessary current are being supplied to the output load by output filtering capacitor C1. Voltage $V_{out}$ is applied to error amplifier 12, which compares a voltage corresponding to $V_{out}$ to a reference voltage and supplies an error signal to coupler 13, which may be an opto-coupler for providing isolation between the input and output sections of the power supply. Coupler 13 then supplies a corresponding feedback signal $V_{fs}$ to pulsewidth modulator 10, which, if necessary, adjusts the duty cycle (i.e., time on/time off) of a fixed frequency quasi-squarewave control signal applied to the control gate of switching transistor Q1 to adjust the amplitude of $V_{out}$.

When transistor Q1 is switched off by control of pulsewidth modulator 10, the magnetic field in the core of transformer T1 tries to collapse, and in doing so reverses the voltage polarities on all windings. Thus, the voltage at the dot-end of secondary winding W2 is now positive with respect to groun GND2 and rises until it forward biases diode D1, where it becomes clamped at $V_{out}+0.7$ volts. The energy stored in transformer T1 is now released into the output load at a current required by the load and recharges capacitor C1 to the desired voltage.

A block diagram of prior art pulsewidth modulator 10, shown in the above mentioned *Motorola Data Book* on p. A-74, is shown in FIG. 1b. This pulsewidth modulator requires oscillator 16 to generate a fixed frequency sawtooth waveform, shown in FIG. 1b, graph A. This sawtooth waveform is applied to the plus (+) terminals of comparators 18 and 20. Feedback signal $V_{fs}$ from coupler 13 is applied to the minus (−) terminal of comparator 20 so that, as shown in FIG. 1b, graph B, when the amplitude of the sawtooth waveform exceeds $V_{fs}$, the output of comparator 20 goes high. This comparator 20 output signal is then OR'ed by OR gate 22 with the output of comparator 18, whose only function is to provide an initial signal for startup of the power supply. The resulting quasi-squarewave output of OR gate 22 is then amplified by transistor Q2 and applied to the gate of switching transistor Q1, which switches on and off in response to the output of OR gate 22 with the proper duty cycle to achieve the desired $V_{out}$. Thus, when $V_{out}$ is lower than a predetermined level, the on-time of switching transistor Q1 increases, raising $V_{out}$ to the desired level. More detail on these oscillators may be found in the book *Switching and Linear Power Supply, Power Converter Design*, by Abraham Pressman, Hayden Book Company, N.J., 1977, pp. 316–319.

SUMMARY

A novel control circuit is disclosed which provides a variable frequency, quasi-squarewave control signal to a switching transistor in a non-symmetrical switching power supply. In this novel control circuit, there is no independent oscillator used to provide a triangular or sawtooth waveform at a fixed frequency. Instead, a primary winding of a sense transformer is coupled in series with a switching transistor and a primary winding of a power transformer. Consequently, the current through the primary winding of the power transformer is identical to the current through the primary winding of the sense transformer. A loading resistor is placed across a secondary winding of the sense transformer so that when the switching transistor is switched on, an current through the primary winding of the sense transformer ramps up, an increasing voltage is generated across the secondary winding of the sense transformer corresponding to the increasing current through the primary winding. This increasing voltage, added onto a fixed bias voltage, is compared by a voltage comparator to a feedback signal corresponding to the output voltage of the power supply. The output of the voltage comparator drives the switching transistor, so that when the voltage across the secondary winding of the sense transformer, plus the bias voltage, exceeds that of the feedback signal, the output of the voltage comparator will go low, turning the switching transistor off. The power transformer now dumps its stored energy into the output load. In order to prevent the switching transistor from immediately switching back on due to the feedback signal now exceeding the voltage across the secondary winding of the sense transformer, the switching transistor is inhibited from turning on while the power transformer is dumping its energy. When it is indicated that the energy in the power transformer has been depleted, the switching transistor is enabled and switches on to once again charge the power transformer until the voltage across the secondary winding of the sense transformer, plus the bias voltage, exceeds that of the feedback signal. Thus, the duty cycle of the switching transistor is being constantly adjusted to keep the power supply output voltage at a predetermined level.

DETAILED DESCRIPTION

General

Figure 1A:
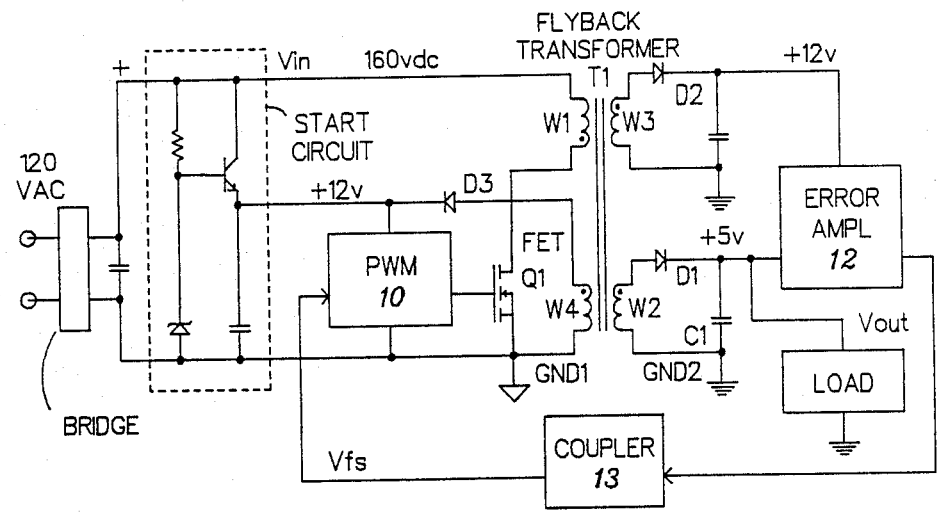
FIG. 1a shows a prior art non-symmetrical power supply.
Figure 1B:
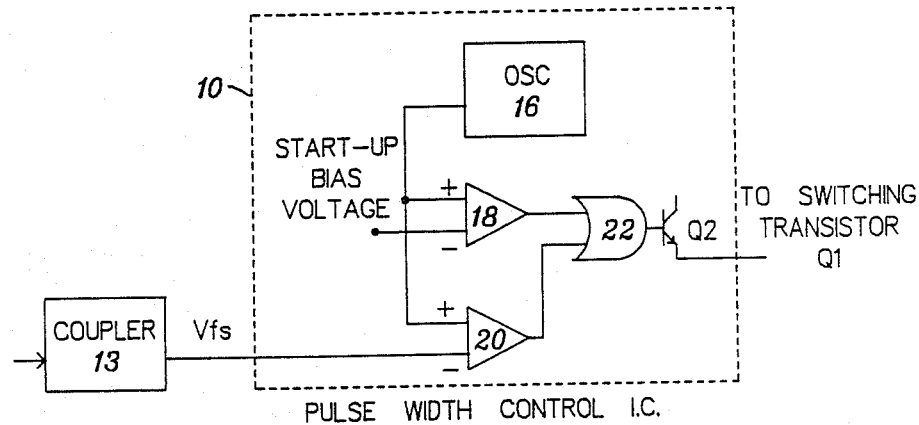
FIG. 1b shows a block diagram of pulsewidth modulator 10 in FIG. 1a along with various voltages generated within pulsewidth modulator 10.
Figure 1B:
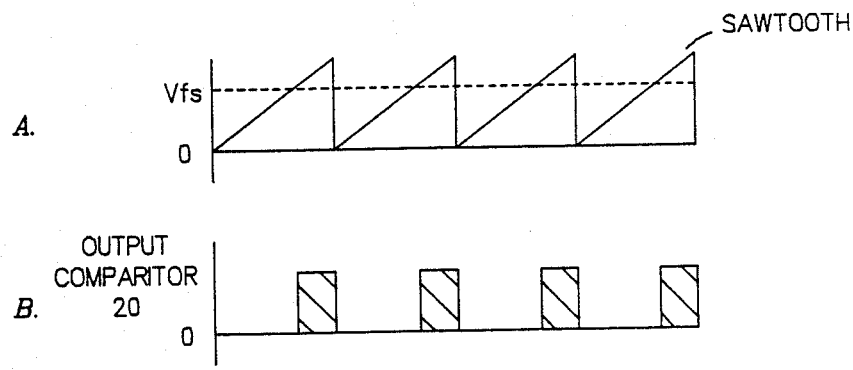
Figure 2:
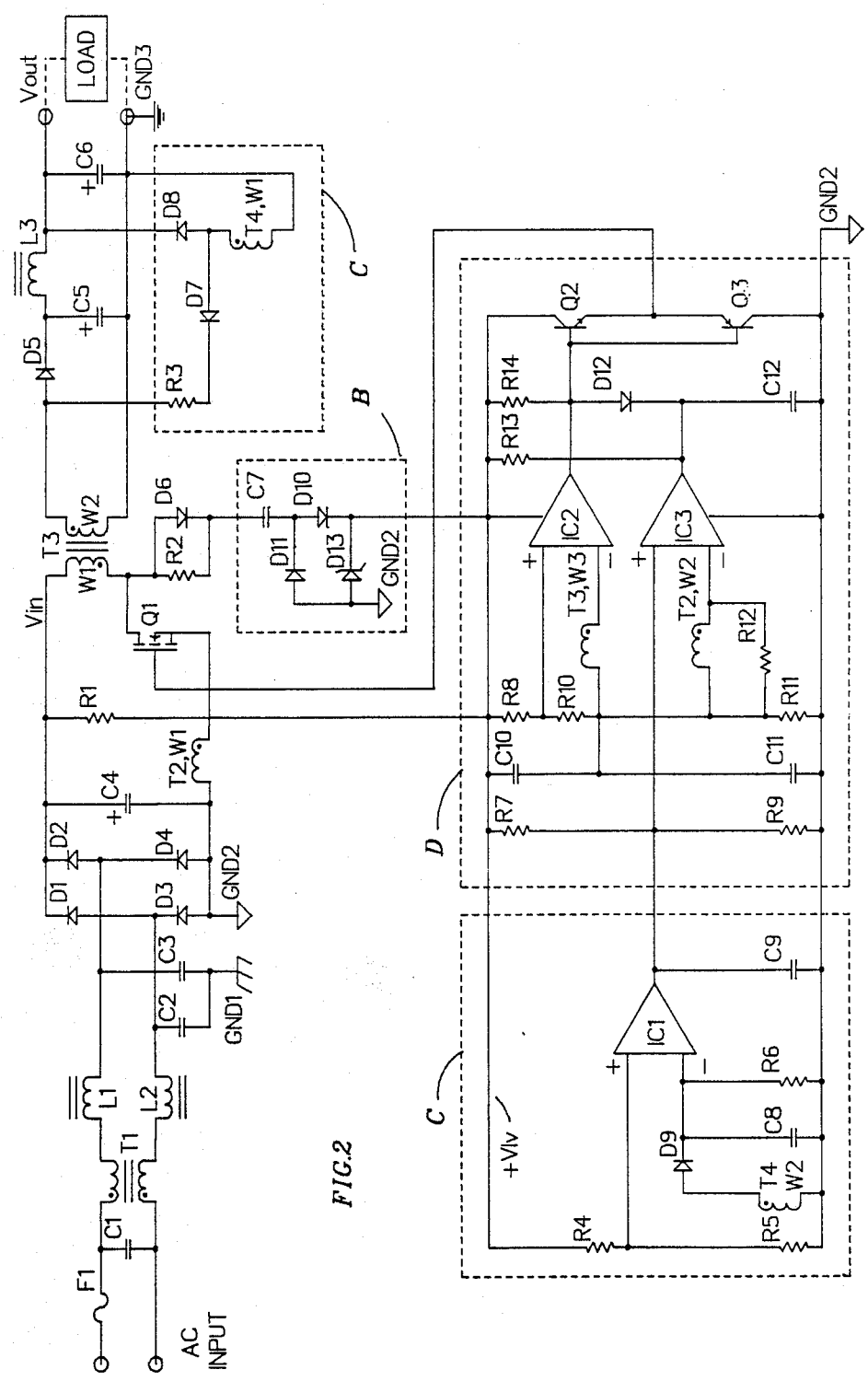
FIG. 2 illustrates the preferred embodiment of my invention incorporated in a non-symmetrical power supply.

Shown in FIG. 2 is a flyback type non-symmetrical switching power supply incorporating my inventive control circuit. My invention, however, may be incorporated into any non-symmetrical switching power supply where current is loaded into the magnetic device, such as a transformer or an inductor, in one direction only. In the circuit of FIG. 2, an AC input signal passes through fuse F1 and is applied to a typical EMI/RFI line interference circuit comprising capacitor C1, transformer T1, inductors L1 and L2, and capacitors C2 and C3. The AC signal is then rectified by diodes D1, D2, D3, and D4, forming a full-wave bridge, and filtered by capacitor C4 to generate a high voltage DC input voltage $V_{in}$. Voltage $V_{in}$ is coupled to the non-dot-end of primary winding W1 of power transformer T3. The dot-end of winding W1 of power transformer T3 is connected to the drain of N-channel MOS switching transistor Q1, with the source of transistor Q1 connected to the dot-end of primary winding W1 of sense transformer T2 and the non-dot-end of winding W1 of sense transformer T2 connected to ground GND2. Switching transistor Q1 is turned on and off by control circuit D. In the flyback circuit of FIG. 2, the output voltage $V_{out}$ of the power supply is determined by the duty cycle (time on/time off) of switching transistor Q1.

Duty Cycle Control by Circuit D

When transistor Q1 is turned on, an increasing current flows through the serial combination of winding W1 of power transformer T3, switching transistor Q1, and winding W1 of sense transformer T2. This current ramps up linearly through this serial combnnation due to the inductance of the windings. As current is ramping up through winding W1 of sense transformer T2, a voltage is generated across secondary winding W2 of sense transformer T2. Load resistor R12 is placed across winding W2 of sense transformer T2 to load the winding in order to configure T2 as a current sense transformer. As current increases through winding W1 of sense transformer T2, the current through resistor R12 across winding W2 wlll similarly increase, resulting in an increasing voltage across resistor R12.

Resistors R8, R10, and R11 are connected in series between low voltage $V_{LV}$ and ground GND2, with resistor values such that the voltage between resistors R10 and R11 is $V_{LV}/2$. Load resistor R12, in parallel with winding W2 of sense transformr T2, is coupled to the common point of resistors R10 and R11 and coupled to the minus (−) input terminal of voltage comparator IC3, which is an open collector type operating at maximum gain, so that when switching transistor Q1 is on, the voltage into the minus (−) terminal of IC3 will increase from $V_{LV}/2$ to a voltage determined by the magnitude of current through winding W1 of sense transformer T2.

The plus (+) input terminal of voltage comparator IC3 is coupled to a bias voltage greater than $V_{LV}/2$, as determined by a voltage divider comprising resistors R7 and R9 in series between $+V_{LV}$ and ground GND2. This bias voltage is modulated by the output of voltage comparator IC1, which is an open collector type operating at maximum gain. Voltage comparator IC1 lowers the bias voltage into the plus (+) terminal of IC3 if $V_{out}$ is above a predetermined level as determined by voltage sense circuit C, which includes IC1. Voltage sense circuit C will be discussed later.

When the rising voltage at the minus (−) terminal of IC3 exceeds the voltage at its plus (+) terminal, the output of IC3 goes low, sinking current and turning off switching transistor Q1. Thus, the length of time switching transistor Q1 is on is determined by the time it takes the linearly increasing voltage at the minus (−) terminal of IC3 to exceed the voltage at the plus (+) terminal of IC3. Since the voltage at the plus (+) terminal of IC3 is lowered if $V_{out}$ is above a predetermined level, switching transistor Q1 will be on for a shorter time if $V_{out}$ is above this predetermined level, resulting in $V_{out}$ being lowered.

Charging/Dumping Phase Indicator

Once switching transistor Q1 is turned off, the voltage across winding W2 of sense transformer T2 will be zero, and the output of IC3 will go high after a short delay caused by action of capacitor C12 coupled between the output of IC3 and ground GND2. This delay is to keep transistor Q1 off during the propagation delay of IC2. To prevent this high output from immediately turning switching transistor Q1 on again, an inhibitor is employed to inhibit switching transistor Q1 from turning on while transformer T3 is dumping its energy into the output load. This inhibitor is constructed and operates as follows. The non-dot-end of auxiliary winding W3 of power transformer T3 is coupled to a voltage of $V_{LV}/2$, set by the voltage between resistors R10 and R11 of the voltage divider comprising resistors R8, R10, and R11 in series between the low voltage power supply terminal and ground GND2, with the dot-end of winding W3 coupled to the minus (−) terminal of voltage comparator IC2, IC2 being an open collector type operating at maximum gain. Therefore, while power transformer T3 is dumping its energy into the output load, the voltage at the dot-end of winding W3 will be positive with respect to its non-dot-end. And, when power transformer T3 is charging, the voltage at the dot-end of winding W3 will be negative with respect to its non-dot-end.

The plus (+) terminal of IC2 is coupled to a voltage of slightly above $V_{LV}/2$, since the plus (+) terminal is coupled between resistors R8 and R10 and resistor R10 is small. The voltage at the plus (+) terminal of IC2 must be slightly higher than the voltage at its mnnus (−) terminal in order to turn on switching transistor Q1 from a dead start. Capacitors C10 and C11, in series between voltage $V_{LV}$ and ground GND2, provide AC filtering of $V_{LV}$.

During the time switching transistor Q1 is on and the dot-ends of windings W1, W2, and W3 of power transformer T3 are negative with respect to their non-dot-ends, the output of IC2 will be an open circuit and not affect switching transistors Q1. When switching transistor Q1 is switched off by control of the output of IC3, the dot-ends of the windings of power transformer T3 will reverse polarity and be positive with respect to their non-dot-ends, and, thus, the output of IC2 will be low until power transformer T3 has dumped all its energy. This low output of IC2 is coupled to the bases of NPN transistor Q2 and PNP transistor Q3, configured as emitter followers to act as a current amplifier. The gate of switching transistor Q1 is coupled to the shorted emitters of transistors Q2 and Q3. The collector of transistor Q2 is coupled to $V_{LV}$, and the collector of transistor Q3 is coupled to ground GND2. Therefore, when the output of IC2 is low, indicating that power transformer T3 is dumping its energy, transistor Q2 is switched off and transistor Q3 is switched on, ensuring that the gate of switching transistor Q1 is at a low voltage and inhibiting switching transistor Q1 from turning on during the time power transformer T3 is dumping its energy. When power transformer T3 has completed dumping its energy, the voltage at th plus (+) terminal of IC2 will exceed the voltage at its minus (−) terminal, and the output of IC2 will be an open circuit. The output of IC3 will already be high, or an open circuit, as capacitor C12 has charged through resistor R13. The voltage, $V_{LV}$, across capacitor C12 is blocked from the output of IC2 by reverse biased diode D12, and pull-up resistor R14 pulls up the voltage at the output of IC2 to $V_{LV}$. Thus, when the outputs of IC2 and IC3 are high, or open circuits, the voltage at the bases of transistors Q2 and Q3 is $V_{LV}$, which turns transistor Q2 on and transistor Q3 off, resulting in switching transistor Q1 being switched on and power transformer T3 being charged. Switching transistor Q1 is subsequently switched off when current through winding W1 of sense transformer T2 exceeds a level necessary to maintain the desired amplitude of $V_{out}$, and the dumping phase begins. Thus, switching transistor Q1 switches on and off without the need of a fixed frequency oscillator.

Operation of Voltage Sense Circuit C

Sense circuit C detects the amplitude of power supply output voltage $V_{out}$ and modulates the voltage at the plus (+) terminal of IC3 via voltage comparator IC1. Sense circuit C is described in detail in a copending application entitled "An Improved Voltage Regulator Circuit", by David T. Carroll, Ser. No. 07/137,787, filed Dec. 23, 1987 which is submitted along with this application and previously incorporated by reference.

During the time that switching transistor Q1 is on and power transformer T3 is charging, the voltage polarity across secondary winding W2 of power transformer T3 is such that output rectifying diode D5, whose anode is connected to the dot-end of winding W2, is reverse biased. The voltage across winding W2 of power transformer T3 does, however, forward bias diode D7, whose cathode is coupled to the dot-end of winding W2 via resistor R3, and whose anode is coupled to the dot-end of winding W1 of voltage sense transformer T4. Thus, when power transformer T3 is charging, current flows through winding W1 of voltage sense transformer T4 hhrough ground GND3 and back through winding W2 of power transformer T3, and charges the core of voltage sense transformer T4 to saturation. Secondary winding W2 of voltage sense transformer T4 has a voltage across it such that diode D9, whose anode is connected to the dot-end of winding W2 of voltage sense transformer D4, is reverse biased, and therefore, energy cannot be dissipated through winding W2. When switching transistor Q1 is switched off and the voltage polarity across winding W2 of power transformer T3 reverses, the energy stored in power transformer T3 is released into the output load at a voltage of approximately $V_{out}+0.7$ volts, where 0.7 volts is the nominal voltage drop across output rectifying diode D5. The energy released by power transformer T3 also recharges output filtering components capcitors C5 and C6 and inductor L3. The voltage across winding W1 of voltage sense transformer T4 similarly reverses its polarity and forward biases diode D8, whose anode is coupled to the dot-end of winding W1 of voltage sense transformer T4 and whose cathode is coupled to voltage $V_{out}$. Thus, the voltage across winding W1 of voltage sense transformer T4 will be at a voltage of approximately $V_{out}+0.7$ volts, where 0.7 volts is the voltage drop across diode D8. As energy in voltage sense transformer T4 is released through forward biased diode D8, a voltage is generated across winding W2 of voltage sense transformer T4 with respect to ground GND2 which corresponds to the voltage across winding W1 of voltage sense transformer T4. This voltage forward biases diode D9 and charges capacitor C8. Resistor R6, coupled in parallel with capacitor C8, acts to average the voltage over a period of time since capacitor C8 is initially charged to the peak voltage across winding W2 of sense transformer T4. This voltage is applied to the minus (−) terminal of voltage comparator IC1, which is an open collector type operating at maximum gain. A voltage divider comprising resistors R4 and R5 in series between $V_{LV}$ and ground GND2 provide a reference voltage for application to the plus (+) terminal of IC1, so that if the voltage at the minus (−) terminal of IC1 exceeds the voltage at the plus (+) terminal of IC1, the output of IC1 will try to go low. Alternatively, if the voltage at the minus (−) terminal of IC1 is below that at the plus (+) terminal of IC1, the output of IC1 will be an open circuit.

Capacitor C9, coupled between the output of IC1 and ground GDN2, charges to a voltage greater than $V_{LV}/2$, as determined by the values of resistors R7 and R9, when IC1 is an open circuit, and has charge removed by IC1 when the output of IC1 goes low. Hence, since capacitor C9 is also coupled to the plus (+) terminal of IC3, the voltage at the plus (+) terminal of IC3 will be lowered when $V_{out}$ exceeds a predetermined voltage set by the voltage divider network of resistors R4 and R5. Conversely, the voltage at the plus (+) terminal of IC3 will be greater than $V_{LV}/2$ when $V_{out}$ is below that predetermined voltage level.

Operation of Snubber Circuit

Resistor R2 and diode D6 in parallel coupled to the drain of switching transistor Q1, in conjunction with capacitor C7, form a snubbing network to improve the load line of switching transistor Q1. When switching transistor Q1 switches off, the voltage across winding W1 of power transformer T3 will instantaneously reverse its voltage polarity and, without the snubber circuit, would rapidly rise to a high voltage. It is this rapid rate of change that deteriorates the load line of switching transistor Q1 due to internal effects. When switching transistor 11 is switched off, the dot-end of winding W1 of power transformer T3 becomes positive with respect to ground GND2, and a current flows through diode D6, capacitor C7, and diodes D10 and D13 to ground GND2. Capacitor C7 is discharged to ground when transistor Q1 switches on by means of current flowing through the current path of diode D11, capacitor C7, resistor R2, transistor Q1, and winding W1 of transformer T2. Thus, the addition of capacitor C7 prevents the voltage at the drain of switching transistor Q1 from flying up or down instantaneously. Capacitor C7 also reduces dangerous ring voltages as a result of stray capacitance and increases the efficiency of the circuit by reducing high frequency harmonics in the magnetic devices subject to the squarewaves.

Operation of Low Voltage Power Supply

In low voltage power supply B the energy absorbed to limit the voltage across winding W1 of power transformer T3 is not wasted but is used to provide additional power to circuits C and D proportional to the switching frequency of switching transistor Q1. Biasing the gate of switching transistor Q1 on and off results in losses due to the transistor's intrinsic gate-drain capacitance having to be charged and discharged. These losses result in one-half of the stored energy being lost resistively. Thus, in low voltage power supply B, the increased gate discharging losses at higher switching frequencies are offset by the incraased power made available at the higher switching frequencies.

When switching transistor Q1 is off, current flows through capacitor C7, diode D10, and zener diode D13 to ground GND2, wherein the anode of diode D10 is coupled to capacitor C7, and the cathode of diode D10 is coupled to zener diode D13 and to capacitors C10 and C11 in series coupled to ground GND2. Zener diode D13, coupled to $V_{in}$ through resistor R1, sets low voltage power supply voltage $V_{LV}$. Capacitors C10 and C11 filter AC from $V_{LV}$. Thus, when diode D10 is forward biased, part of the current flowing through diode D10 is used to recharge capacitors C10 and C11 to the zener diode voltage. Thus, energy is supplied to control circuits C and D which normally would be wasted resistively during the damping of the voltage rise across winding W1. If operating frequencies increased, current would recharge capacitors C10 and C11 more often, thus supplying the increased power required to charge and discharge the gate of switching transistor Q1. Therefore, a low loss snubber and efficient low voltage power supply is herein described.

Conclusion

A novel non-symmetrical switching power supply control circuit has been described herein which provides pulsewidth modulation without the need for a fixed frequency oscillator. As is apparent, my inventive circuit, which determines when a power transformer has been sufficiently charged to produce a desired power supply output voltage and generates the appropriate quasi-squarewave waveform for application to a switching transistor, may be incorporated in any prior art non-symmetrical switching power supply to provide pulsewidth modulation, whether the power supply be regulated by a feedback signal or not. The concept of monitoring the current through the primary winding of a power transformer, or other magnetic device, and using this current to generate a signal to be compared with a fixed or variable voltage to determine whether the magnetic device has been sufficiently charged may be implemented in a variety of ways which will be obvious to those skilled in the art. Accordingly, while the invention has been particularly shown and described with reference to the preferred embodiment thereof, it will be understood by those skilled in the art that deviations may be made therein without departing from the spirit and scope of the invention.

I claim:

1. A pulsewidth modulator comprising:
   a sense transformer having a primary and a secondary winding, wherein said primary winding is coupled in series with a first winding of a magnetic device in a switching power supply;
   a resistor in parallel with said secondary winding for loading said secondary winding;
   a comparator means coupled to said secondary winding for detecting when a voltage across said secondary winding exceeds a certain signal level and producing at an output of said comparator a corresponding comparator output state;
   an inhibitor means coupled to said magnetic device for detecting when said magnetic device is storing or releasing energy and producing at an output of said inhibitor means a corresponding inhibitor output state;
   a control means coupled to said outputs of said comparator means and said inhibitor means for detecting said comparator output state and said inhibitor output state and generating a quasi-squarewave signal in response to said comparator and inhibitor output states for application to a switching means, said quasi-squarewave signal having a duty cycle corresponding to the amplitude of said certain signal level.

2. The pulsewidth modulator of claim 1 wherein said amplitude of said certain signal level is related to an output voltage of said switching power supply.

3. The pulsewidth modulator of claim 1 wherein said inhibitor means comprises an auxiliary winding of said magnetic device with one end of said auxiliary winding coupled to a first input terminal of a second comparator means and an opposite end of said auxiliary winding coupled to a first fixed bias voltage, wherein said second comparator means compares a voltage at said first input terminal with a second fixed bias voltage at a second input terminal and produces an output state corresponding to the polarity of voltage across said auxiliary winding.

4. A non-symmetrical switching power supply with voltage regulator comprising:
   a magnetic device having a first winding with a first and second end and a second winding, wherein an input voltage is coupled to said first end of said first winding;
   a switching means having a first terminal coupled to said second end of said first winding of said magnetic device, wherein said magnetic device charges when said switching means is on and releases its stored energy into an output load when said switching means is off;
   a rectifying and filtering means coupled to said second winding of said magnetic device for rectifying and filtering an AC output voltage generated across said second winding of said magnetic device in response to said switching means and providing a DC output voltage to said output load;

a first winding of a sense transformer coupled between a second terminal of said switching means and a ground terminal;

a second winding of said sense transformer coupled to a first terminal of a first voltage comparator, said second winding having a load resistor across it so that when said magnetic device chrrges, an increasing voltage is applied to said first terminal of said first voltage comparator;

a feedback circuit means coupled to receive said DC output voltage for generating a DC feedback signal corresponding to said DC output voltage, said feedback signal modulating a DC bias voltage applied to a second terminal of said first voltage comparator so that when a voltage across said second winding of said sense transformer exceeds said voltage applied to said second terminal, said first voltage comparator will produce at an output of said first voltage comparator a corresponding output state;

an inhibitor means coupled to said magnetic device for detecting when said magnetic device is storing or releasing energy and producing at an output of said inhibitor means a corresponding output state; and controlling means coupled to said outputs of said first voltage comparator and said inhibitor means for detecting said first voltage comparator output state and said inhibitor output state and generating a quasi-squarewave output signal in response to said voltage comparator and inhibitor output states for application to a control terminal of said switching means for regulating said DC output voltage.

5. The device of claim 4 wherein said magnetic device is a power transformer.

6. The device of claim 4 wherein said inhibitor means comprises a third winding of said power transformer wherein one end of said third winding is coupled to a first terminal of a second voltage comparator, and a fixed bias voltage is applied to a second terminal of said second voltage comparator, wherein an output state of said second voltage comparator corresponds to whether said power transformer is charging or releasing energy, and wherein said output state of said second voltage comparator is applied to said controlling means so that said controlling means is prevented from turning on said switching means while said power transformer is releasing energy.

* * * * *